July 21, 1959 H. B. MALONEY ET AL 2,896,064
TUBULATION APPARATUS
Filed March 25, 1957 3 Sheets-Sheet 1

INVENTORS
HENRY B. MALONEY
WALTER L. RUSSO
By Elmer J. Garn
ATTORNEY

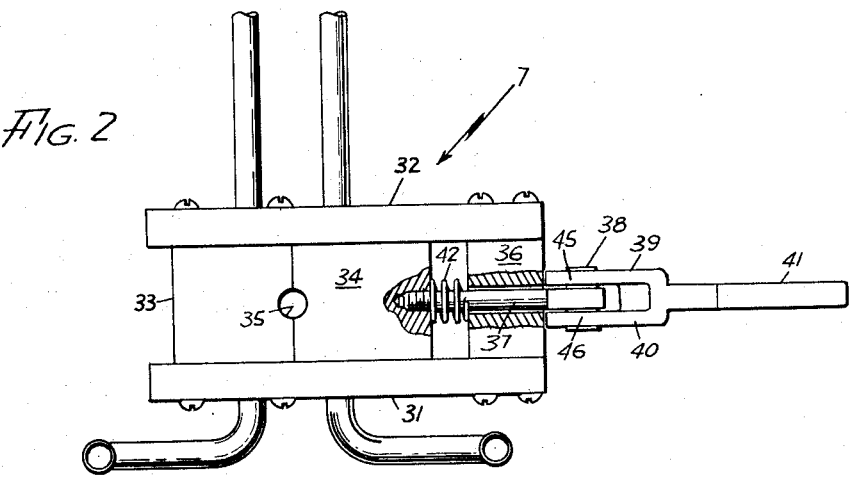
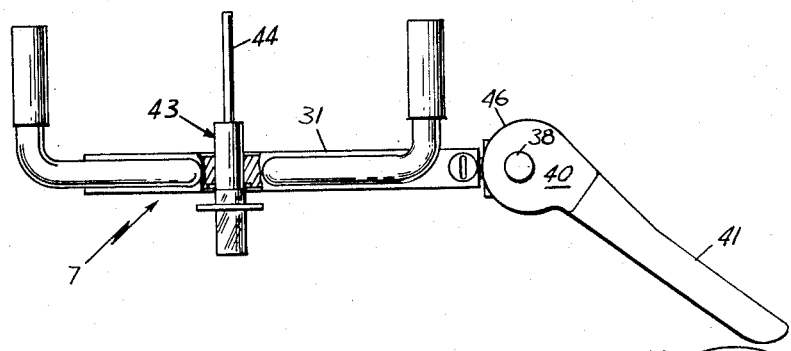
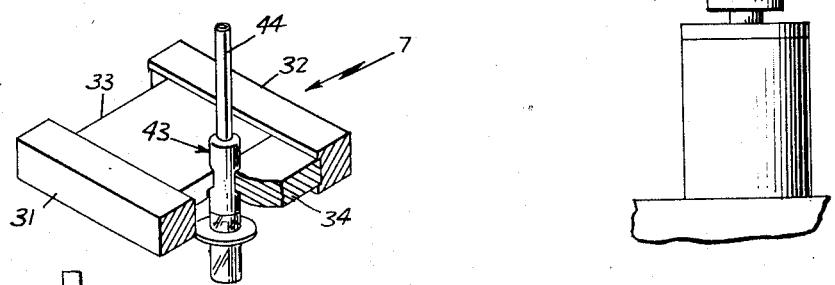
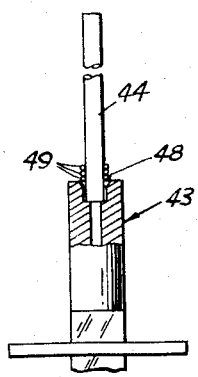

INVENTORS
HENRY B. MALONEY
WALTER L. RUSSO
BY Elmer J Gorn
ATTORNEY

United States Patent Office 2,896,064
Patented July 21, 1959

2,896,064

TUBULATION APPARATUS

Henry B. Maloney, Wakefield, Mass., and Walter L. Russo, Wilton, Maine, assignors to Raytheon Company, a corporation of Delaware Application March 25, 1957, Serial No. 648,228

4 Claims. (Cl. 219—85)

This invention relates generally to apparatus for use in the manufacture of electron discharge devices, and more particularly to a novel tubulation machine for automatically attaching metal exhaust tubes to electron discharge devices.

In the manufacture of certain types of electronic tubes it is often necessary to fasten a metal exhaust tubulation to the electronic tube in order to provide means for evacuating the device at a later stage of the manufacturing cycle. In the past, this operation has been performed manually on a bench by an operator utilizing one work-holding fixture which was enclosed in a transparent plastic housing having a sliding door in order to allow the operator to insert each tube prior to soldering, and to remove it after soldering. This arrangement necessitated that the operator raise the door, place the tube on the work-holding fixture, lower the door and open a valve in order to fill the housing with a gaseous matter, usually hydrogen, while the actual soldering took place. After soldering, the tube had to be cooled by blowing a jet of air on it before the operator could remove it from the housing. As a result, the operation was slow, cumbersome and lacking in uniformity of result, since it was dependent to a great extent on the skill of the individual person doing the soldering.

In accordance with the present invention, there is provided an automatic and highly efficient mechanical apparatus adapted to receive the electron tubes to which the exhaust tubulation is to be soldered, and to transport them around a turret table wherein the soldering operation is performed as the table indexes from one stationary position to the next. The tubes are loaded into heads provided on the turret table; the heads additionally being provided with a loop of conducting material which cooperates with a plurality of stationary loops at each indexing position to provide the necessary heat for the soldering operation. The tubes need only be handled by the person operating the apparatus once, that is, when each tube is clamped into the tube-holder prior to commencing the soldering cycle. All successive operations, including ejection of the finished tube from the apparatus, are effected automatically, thereby resulting in finished products which are more uniformly and more quickly produced than heretofore feasible.

The invention will be better understood as the following description proceeds taken in conjunction with the accompanying drawings wherein:

Fig. 2 is a top view of a tube-holding fixture, one of which is attached to each of the heads;

Fig. 3 is a side view of the fixture shown in Fig. 2;

Fig. 5 is a partially cross-sectioned side view of an electron discharge device showing the manner of locating the exhaust tubulation therein prior to the soldering operation; and Fig. 6 is a partial cross-sectioned perspective view showing the tube as it is held by the tube-holding fixture during soldering.

Figure 1:
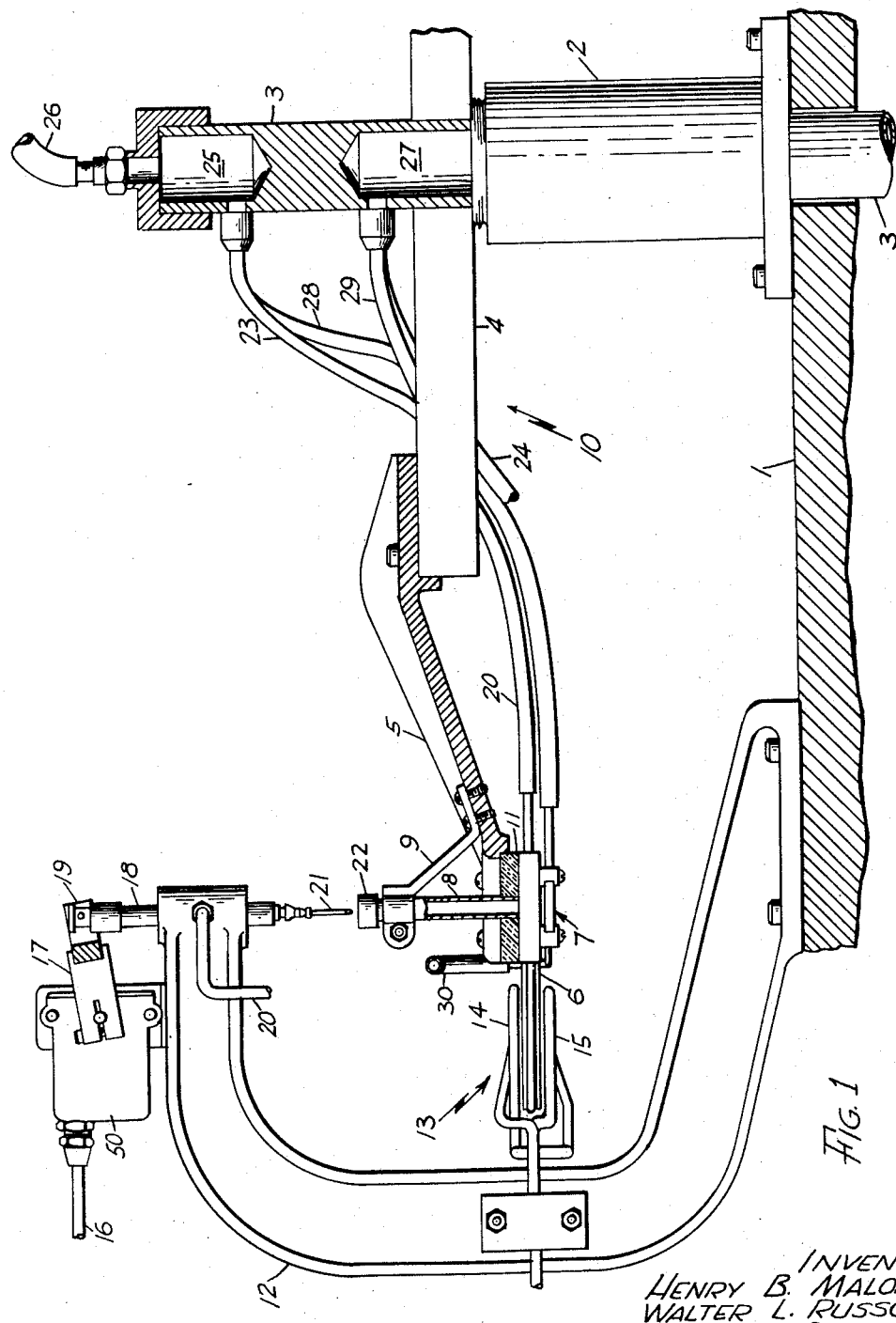
Fig. 1 is a partially cross-sectioned side view of the turret table showing one of the plurality of the soldering heads or stations located on the top surface of the turret table.
Figure 4:
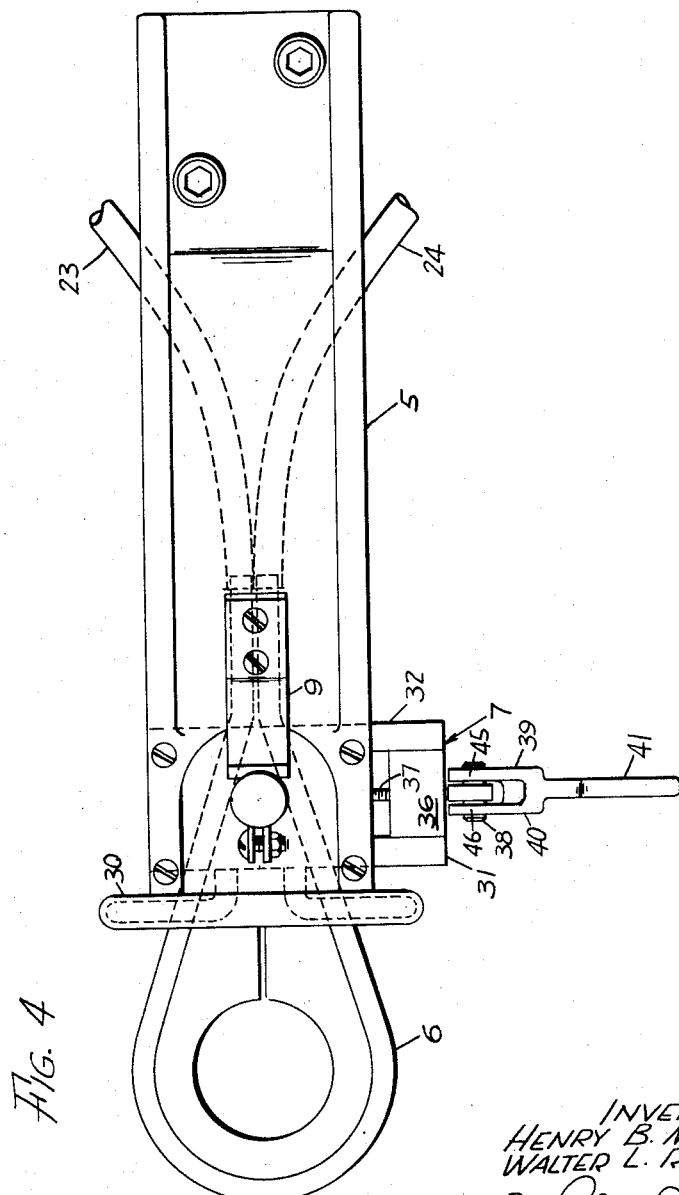
Fig. 4 is a top view of the work-holding arm attached to each head showing the location of the secondary R.F. heating loop.

Referring now to the drawings and more particularly to Figs. 1 and 4 thereof, there is shown a tubulation apparatus in accordance with the present invention wherein the numeral 10 designates generally one of a plurality of heads located at spaced intervals around the top surface of a movable turret table 4. As shown, the structure supporting each of the heads 10 comprises a base portion 2, a bar 3 extending through the base portion 2, a stationary table 1, and the rotatable turret table 4, attached to the upper portion of the bar 3. Fastened to the outer periphery of turret table 4 is an arm 5, the lower portion of the arm 5 having attached thereto a loop of conducting material 6, which forms the secondary of an R.F. heating element, and a tube-holding fixture 7. Positioned on the top surface of the lower end of the support arm 5 is a tubular member 8 rigidly attached to arm 5, and adapted to be supported in an upright position by the bracket 9. The tubular member 8 is hollow, and extends through the top portion of the bracket 5 and through the heat-insulating member 11 in order to receive the metal exhaust tubulation, which is positioned in the top of a tube held by the tube-holder 7, as will be later explained.

Attached to the outer periphery of the stationary table 1 adjacent each of the heads 10 are a plurality of generally U-shaped base brackets 12. At a point opposite the secondary coil 6 of each head 10, each base bracket 12 has attached thereto a primary coil 13 formed into two loops 14 and 15 which are energized by any suitable source (not shown). As the turret table 4 indexes from one stationary position to the next, each secondary loop 6 engages the space between the primary loops 14 and 15 attached to the oppositely-positioned base bracket 12 in order to provide the heat necessary to effect the soldering operation. The top end of the bracket 12 is provided with an automatic gas-injecting unit comprising an actuator 50, which may be hydraulically or air-operated through the line 16, and which has a lever 17 connected to the top end of a plunger 18 by means of a forked clamp 19. The plunger 18, which extends through a bore and is supported in a bushing in the end of bracket 12, is fed from any suitable source (not shown) with an oxide-preventing gaseous substance, such as hydrogen, for example, through the line 20 connected to the side of the top end of the bracket 12. Attached to the lower end of the plunger 18 is a thin, needle-like member 21, through which the gaseous matter fed into the top end of the bracket 12 is caused to flow when the needle 21 is forced through the cap 22 attached to the top end of tubular member 8. In this way, the chamber formed by tubular member 8 is provided with the oxide-preventing gas during the actual soldering in order to achieve mechanically sound solder joints between the exhaust tubulation and the electron tube.

In order to provide means for removing the heat generated during the soldering process, the hollow secondary coil 6 has a plurality of flexible hoses 23 and 24 connected to opposite ends thereof; the hose 23 being fed with a cooling substance, such as water, through the connection to the upper portion of bar 3 which communicates with a chamber 25 into which the cooling substance is fed by the hose 26 attached, in any convenient manner, to the upper end of the bar 3. After the cooling substance circulates through the secondary loop 6, it flows out through the hose 24 and into the cavity 27, and thence to a waste depository through the lower extension of the bar 3. Similarly, a second set of hoses 28 and 29 are connected to the tube-holder 7, so that the cooling substance enters through hose 28 and circulates through one side of the tube holder, through the hose loop 30, thence through the other side of tube holder 7, and out finally into the chamber 27 through the hose 29.

As shown most clearly in Figs. 2 through 4, the tube-holding fixture 7 comprises a plurality of gibs 31 and 32 adapted to hold a stationary block 33 and a movable block 34. The inside edges of blocks 33 and 34 are each provided with a cut-out portion, shown here as semicircular, although other contours designed to accommodate a particular tube shape may be used. The cut-out portions are positioned opposite each other, thereby forming a hole 35 when the two blocks 33 and 34 are brought into contact with each other. A second stationary block 36 is provided at the free end of the tube-holder 7. The movable block 34 has one end of a pin 37 attached thereto in any convenient manner, as by threads, the pin 37 extending through a bore in the stationary block 36 and being connected at its other end by means of a pin 38 to the forked legs 39 and 40 of a tube release lever 41. When the tube release lever 41 is in a down position, as shown in Fig. 3, the sliding block 34 is held in intimate contact with the stationary block 33 by the compression spring 42 which bears against the separated edges of the second stationary block 36 and the movable block 34, thereby forcing the blocks 33 and 34 together in order to rigidly hold the articles to be soldered, such as the pencil tube 43 provided with an exhaust tubulation 44, as illustrated in Figs. 3, 5, and 6.

In order to release the tube from the tube-holder 7 after the soldering process is completed, the forked legs 39 and 40 of the tube release lever 41 are provided with cammed surfaces 45 and 46, which bear against the outside edge of the block 36 as the lever 41 is pushed upwardly by a plunger 47 which may be hydraulically or air operated. Upward movement of the lever arm 41 causes the pin 37, and hence the movable block 34, to be pulled outwardly against the spring 42 thereby releasing the soldered tube from the hole 35 formed by the semicircular cut-out portions in blocks 33 and 34.

As shown in Fig. 5, the top end of the pencil tube 43 may be provided with an exhaust tubulation 44 which is inserted into the chamfered hole 48 in the top portion of the tube. A plurality of rings 49 of any suitable soldering material may be slipped circumferentially around the tubulation 44 and made to rest in and adjacent the chamfered portion of the hole 48. The tube 43 may then be inserted into the hole 35 formed by the cut-out portions in stationary block 33 and movable block 34, and lever 39 may then be pressed downwardly to securely lock the tube in place. It can thus be seen that, at this point, the upper end of tube 43 and the exhaust tubulation 44 will be positioned in the chamber of the utbular member 8. The turret table 4 may then be caused to index one position by suitable electrically-timed actuating means (not shown) in order to commence the soldering operation. As the table indexes, the secondary loop 6 on each head 10 is brought into the space between the plurality of primary loops 14 and 15 attached to each bracket 12. The secondary 6 and the primary 13 thereby form a transformer which provides the heat to melt the solder rings 49 and secure the exhaust tubulation 44 to the pencil tube. After each indexing movement of the table 4, the gas-injecting actuator 50 positioned atop each base bracket 12 operates to force each needle 21 downwardly through each cap 22 in order to inject a desired quantity of oxide-preventing gaseous matter into the tubular members 8. The cap 22 is preferably made of a penetratable substance which automatically seals the hole made by penetration of needle 21 when the needle is withdrawn after gas injection as, for example, para rubber.

Although the number of heads 10 provided on the turret table is not critical, it is preferable that eight equally-spaced heads be used in order that the articles to be soldered may be gradually brought up to the final soldering temperature required, and in order that gas injection may be continued into the tubular members 8 as the articles are cooling after soldering. The final station in the soldering cycle is provided with the plunger 47, shown in Fig. 3, in order to automatically eject the finished tubes from the tube-holder 7, as previously explained.

Although there has been described what is considered to be a preferred embodiment of the present invention, various adaptations and modifications thereof may be made without departing from the spirit and scope of the invention, as defined in the appended claims.

What is claimed is:

1. In combination, an intermittently movable member having a plurality of spaced heads attached thereto, each of said heads including an arm attached at one end to said movable member and having a holding fixture attached to its free end for holding an article to be soldered, said heads further including an elongated hollow chamber positioned above each of said holding fixtures adapted to receive therein said article to be soldered, a conducting loop positioned adjacent each of said holding fixtures and adapted to be moved into operative cooperation with a succession of stationary conducting loops at each intermittent movement of said movable member for heating said article by the transformer action of said movable and stationary loops while said loops are cooperatively related, means for electrically energizing said stationary loops, and means responsive to each intermittent movement of said member for injecting gaseous matter into each of said chambers while said article is being heated.

2. In combination, a turret table having a plurality of spaced heads attached thereto, each of said heads including an arm attached at one end to said turret table and having a holding fixture attached to its free end for holding an article to be soldered, said heads further including an elongated hollow chamber positioned above each of said holding fixtures adapted to receive therein said article to be soldered, a conducting loop positioned adjacent each of said holding fixtures and adapted to move into operative cooperation with a succession of stationary conducting loops at each intermittent movement of said turret table for heating said article by the transformer action of said movable and stationary loops while said loops are cooperatively related, means for electrically energizing said stationary loops, and means responsive to each intermittent movement of said table for injecting gaseous matter into each of said chambers while said article is being heated.

3. In combination, an intermittently movable turret table having a plurality of spaced heads attached thereto, each of said heads including an arm attached at one end to said turret table and having a holding fixture attached to its free end for holding an article to be soldered, said heads further including an elongated hollow chamber positioned above each of said holding fixtures adapted to receive therein said article to be soldered, a secondary conducting loop positioned adjacent each of said holding fixtures, a bracket positioned adjacent each of said heads, each of said brackets supporting a primary conducting loop adapted to cooperate with the secondary loop of the head brought into operative relation therewith by each intermittent movement of said turret table for heating said article by the transformer action of said movable and stationary loops while said loops are cooperatively related, means for electrically energizing said stationary loops, means responsive to each intermittent movement of said member for injecting gaseous matter into each of said chambers while said article is being heated, and means located at one of the positions to which each of said holding fixtures are intermittently moved operative to release said article from said holding fixture after the soldering operation is completed.

4. In combination, an intermittently movable turret table having a plurality of spaced heads attached thereto, each of said heads including an arm attached at one end to said turret table and having a holding fixture attached to its free end for holding an article to be soldered, said heads further including an elongated hollow chamber positioned above each of said holding fixtures adapted to receive therein said articles to be soldered, said chamber being enclosed at the top thereof by a cap of material adapted to seal itself after withdrawal of a penetrating member, a secondary conducting loop positioned adjacent each of said holding fixtures and adapted to be moved into operative cooperation with a succession of stationary primary loops at each intermittent movement of said turret table for heating said article by the transformer action of said movable and stationary loops while said loops are cooperatively related, means for electrically energizing said stationary loops, penetrating members adapted to penetrate each of said caps enclosing the tops of said chambers in response to each intermittent movement of said turret table for injecting gaseous matter into each of said chambers while said article is being heated, and means located at one of the positions to which each of said holding fixtures are intermittently moved operative to release said article from said holding fixture after the soldering operation is completed.

References Cited in the file of this patent

UNITED STATES PATENTS

| | | |
|---|---|---|
| 2,109,323 | Smith | Feb. 22, 1938 |
| 2,373,041 | Martindell | Apr. 3, 1945 |
| 2,422,417 | Hutchinson | June 17, 1947 |
| 2,439,517 | Johnson | Apr. 13, 1948 |
| 2,568,794 | Dieter | Sept. 25, 1951 |
| 2,697,774 | Adler et al. | Dec. 21, 1954 |